Nov. 10, 1931.  N. G. MORICI  1,831,633

POWER TRANSMISSION APPARATUS

Filed Sept. 12, 1929   6 Sheets-Sheet 1

Witness:
William P. Kilroy

Inventor:
Nazarene G. Morici
Hill & Hill
Attys

Nov. 10, 1931.  N. G. MORICI  1,831,633

POWER TRANSMISSION APPARATUS

Filed Sept. 12, 1929  6 Sheets-Sheet 2

Witness:
William P. Kilroy

Inventor:
Nazarene G. Morici
By Hill & Hill
Attys

Nov. 10, 1931. N. G. MORICI 1,831,633
POWER TRANSMISSION APPARATUS
Filed Sept. 12, 1929   6 Sheets-Sheet 3

Witness:
William P. Kilroy

Inventor:
Nazarene G. Morici
By Hill & Hill
Attys.

Nov. 10, 1931. N. G. MORICI 1,831,633
POWER TRANSMISSION APPARATUS
Filed Sept. 12, 1929 6 Sheets-Sheet 4

Witness:
William P. Kilroy

Inventor
Nazarene G. Morici
By Hill & Hill
Attys

Nov. 10, 1931.  N. G. MORICI  1,831,633
POWER TRANSMISSION APPARATUS
Filed Sept. 12, 1929   6 Sheets-Sheet 5

Witness:
William P. Kilroy

Inventor:
Nazarene G. Morici
By Hill & Hill
Attys

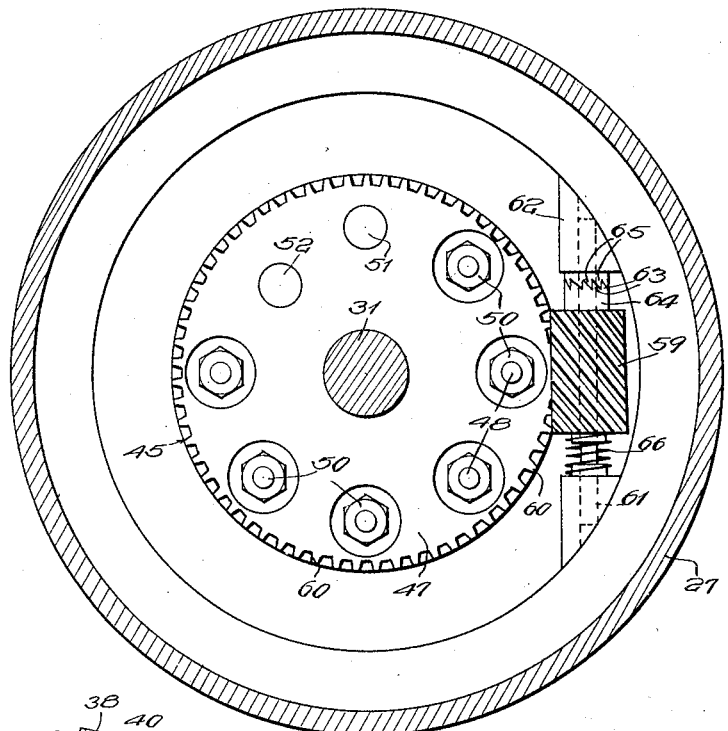

Patented Nov. 10, 1931

1,831,633

UNITED STATES PATENT OFFICE

NAZARENE G. MORICI, OF CHICAGO, ILLINOIS

POWER TRANSMISSION APPARATUS

Application filed September 12, 1929. Serial No. 392,123.

My invention relates to power transmission apparatus and particularly to such apparatus adapted for use in connection with internal combustion engines, electrical motors, and the like.

The invention has among its objects the production of apparatus of the kind described which is relatively simple in construction, compact, reliable, durable, convenient, efficient and satisfactory for use wherever found applicable.

A particular object of the invention is to provide improved power transmission apparatus for operatively connecting the power plant of an automobile to the propeller shaft thereof.

Another particular object of the invention is to provide improved apparatus of the kind described which is substantially automatic in its operation.

Still another particular object of the invention is to provide improved apparatus of the kind described for an automobile, which apparatus avoids the usual shifting of gears, and, if desired, may obviate the use of the clutch.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings of an illustrative embodiment of the invention, wherein like reference characters indicate like or corresponding parts:

Fig. 13 is a transverse sectional elevation on the line 13—13 of Fig. 1; and

Fig. 14 is a diagrammatic sectional view taken substantially as indicated by the line 14—14 of Fig. 2.

Figure 1:
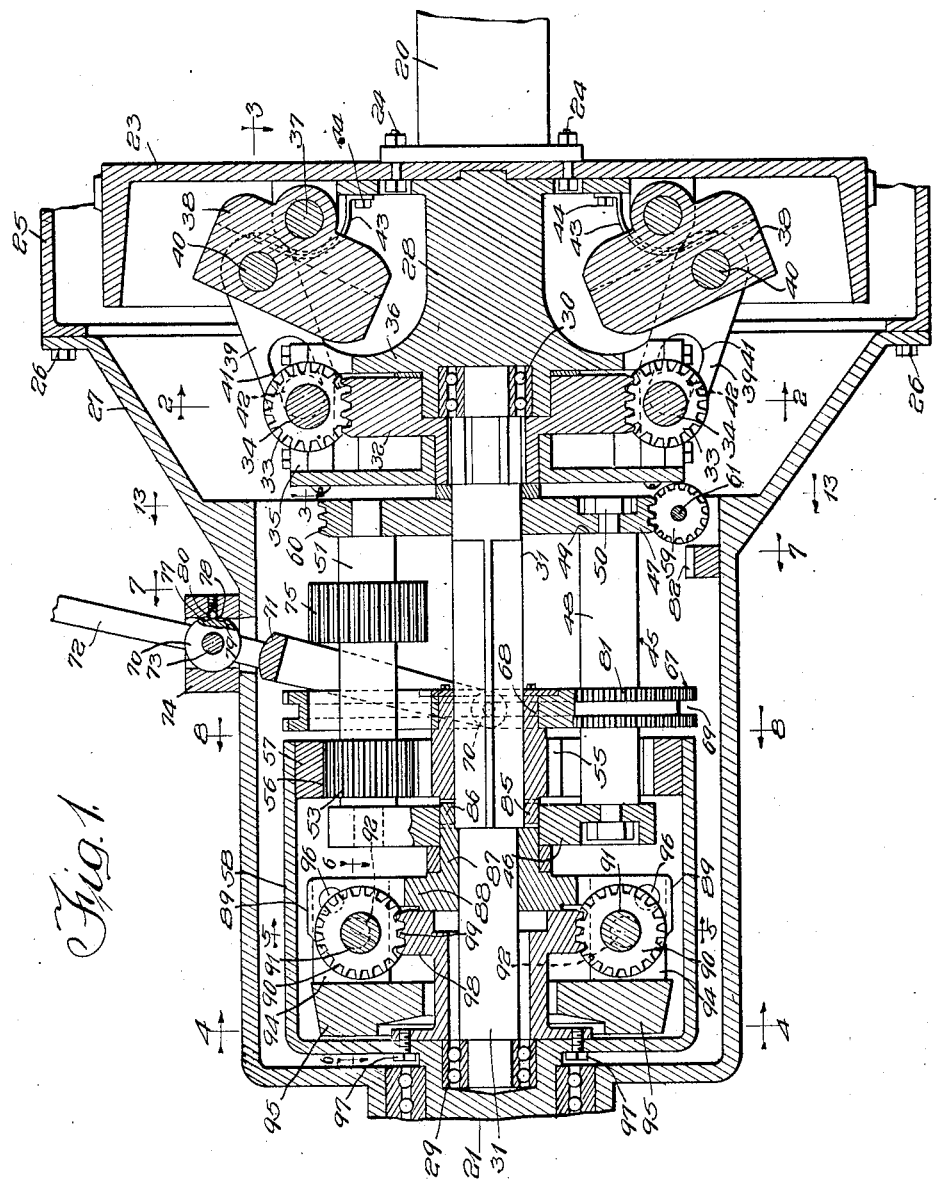
Fig. 1 is a longitudinal central section taken through apparatus embodying the invention.

Referring to the drawings wherein I have shown power transmission apparatus embodying a preferred form of the invention, the reference characters 20 and 21 designated driving and driven members or shafts, respectively, which are operatively connected through the improved apparatus.

For the purpose of this disclosure, the driving shaft 20 may be described as the crank shaft of an internal combustion engine forming part of an automobile, and the driven shaft 21 may be described as the propeller shaft of an automobile, but it will become apparent as this description progresses that the shaft 20 and my improved apparatus may operatively connect the shaft 21 to any other suitable source of power, and that the invention is not limited to use in connection with an automobile.

As best shown in Fig. 1, a fly wheel 23 is rigidly secured to one end of the shaft 20 by bolts 24, the fly wheel 23 being disposed within a bell housing or case 25 forming part of the internal combustion engine. Rigidly secured to the case 25 by means of bolts 26 is a transmission housing 27 in which my improved transmission apparatus is adapted to be positioned.

Secured to the fly-wheel 23 by means of bolts 23a, (Fig. 2) is a bracket 28, and rotatably mounted at its end portions in ball bearings 29 and 30 positioned in the driven element or shaft 21 and bracket 28, respectively, is a shaft section 31 having an axis of rotation coincident with the axes of rotation of the driving and driven shafts 20 and 21.

For establishing a driving connection between the shaft 20 and shaft section 31, the latter is provided adjacent one of its end portions with a toothed gear or worm 32 shown in the present instance as having spirally formed teeth positioned on its outer periphery adapted to mesh and cooperate with suitably formed teeth on a plurality of diametrically disposed pairs of planetary worm gears or pinions 33 secured to shafts 34 shown in the present instance as extending transversely to the axis of rotation of the driving shaft 20 and rotatably mounted in bearings 35 formed in radially extending annularly spaced arms 36 carried by the bracket 28.

Pivotally mounted on the bracket 28 by means of pins 37 are a plurality of centrifugally actuated weights or members 38, also annularly spaced around the axis of rotation of the bracket 28, each of the weights 38 being provided with a pair of links 39 pivotally connected thereto at one of their end portions by means of a pin 40, the opposite end of the links 39 being provided with elongated apertures 41 adapted to receive eccentric or crank portions 42 formed on the pinion shafts 34 and eccentrically related to the axial line thereof. If desired, the weights 38 may be yieldingly held or urged toward the axial line or rotation of the bracket 28 and driving shaft 20 by any suitable means, such, for example, by flat springs 43 secured to the fly wheel 23 by means of bolts 44.

It will be observed from the foregoing description that as the driving shaft 20 is rotated, carrying with it the bracket 28 and pinions 33, the latter will, by reason of their cooperative relationship with the spirally toothed worm 32, be rotated in the bearings 35 formed in the arms 36, and the links 39 will be oscillated about their pivotal connections with the weights 38, and that as the speed of rotation of the driving shaft 20 increases, the weights 38 will be thrown outwardly by centrifugal force exerted thereon, against the action of the springs 43, thus drawing the outer ends of the elongated apertures 41 into closer contact with the cranks or eccentric portions 42 formed on the shafts 34 until such time as the force exerted by a predetermined speed of the driving shaft 20 is sufficient to exert a pull on the links 39 capable of stopping the rotation of the pinions 33 and shafts 34 in their bearings, thereby establishing a driving connection between the pinions 33 and worm 32 secured to the shaft section 31, thus causing the shaft section to rotate in unison with the driving member or shaft 20.

Figure 2:
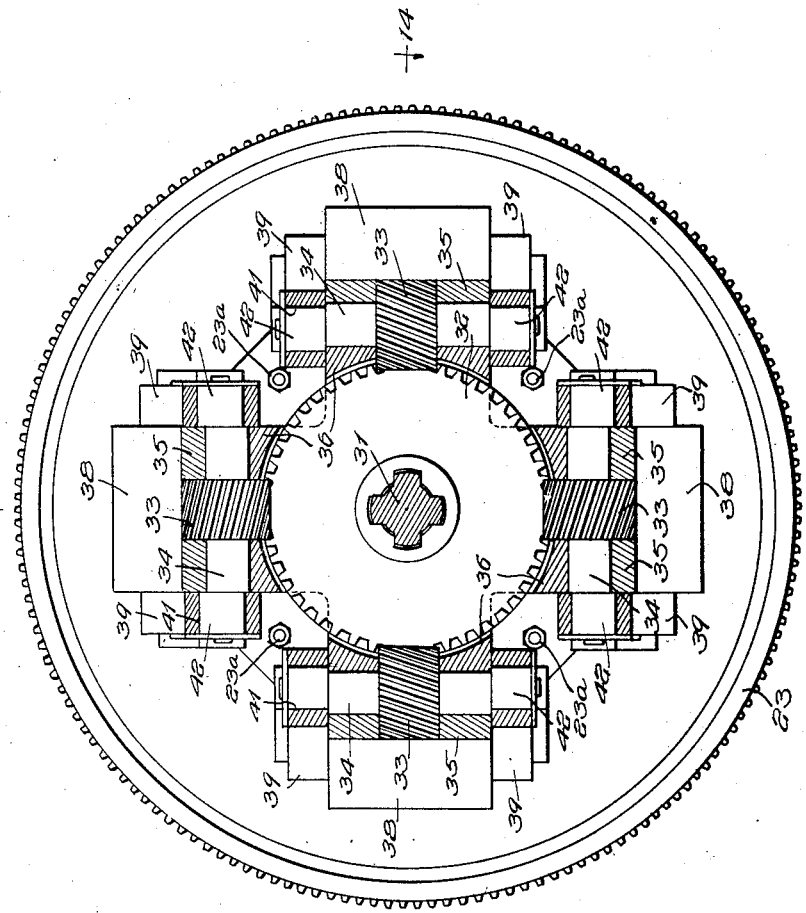
Fig. 2 is a sectional elevation taken substantially as indicated by the line 2—2 of Fig. 1.
Figure 3:
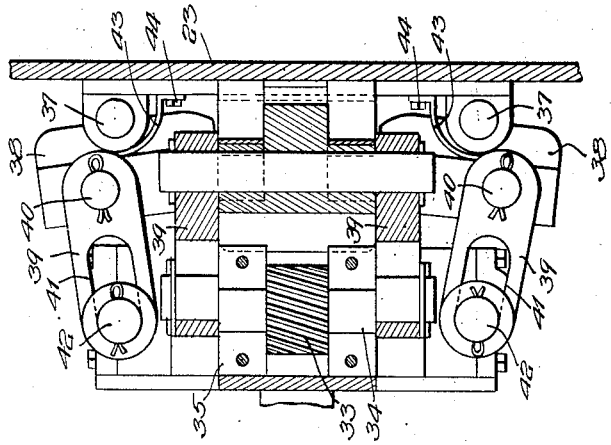
Fig. 3 is a sectional plan view taken substantially as indicated by the line 3—3 of Fig. 1.
Figure 4:
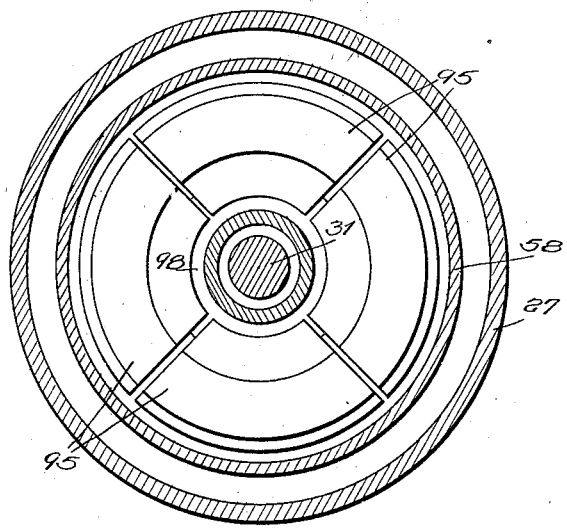
Fig. 4 is a transverse sectional elevation taken on line 4—4 of Fig. 1.

To compensate for and to balance the thrusts exerted on the bracket 28 by the action of the weights 38 and rotation of the member or bracket 28 for stopping the rotation of the pinions 33 in their travel around the worm 32, it is desirable that the axial lines of the cranks or eccentric portions 42 associated with one pair of diametrically disposed pinions 33 be positioned on the opposite side of the axial line of rotation of their respective shafts 34 from the crank or eccentric portions 42 associated with the other pair of diametrically disposed pinions, as clearly shown in Fig. 2 wherein the crank portions 42 of the upper and lower pinions 33 are positioned outwardly of the axial line of rotation of the pinions, while the crank portions 42 associated with the side pinions 33 are positioned inwardly of the axial line of rotation of the pinions. Thus, it will be observed that as a thrust is exerted on the bracket 28 in one direction by a pair of diametrically disposed weights 38, such thrust will be counter balanced by the crank connections with the transversely and diametrically disposed other pair of weights.

For a clearer understanding of the structure just described, reference may be had to Fig. 14 which is a view similar to a portion of Fig. 1 and taken substantially as indicated by the line 14—14 of Fig. 2 showing the crank portion 42 of the pinions 33 in slightly changed position. In the description of Fig. 14, the pinions 33 and associated parts will be referred to as "upper" and "lower" although the "lower" pinion is in reality the side pinion (see Fig. 2).

In the structure shown, it will be understood that the toothed connection between the worm 32 and pinions 33 is non-reversible, in other words, the relative rotation of the worm will rotate the pinions on their respective axes, but the rotation of the pinions will not drive the worm.

It will be noted, by reference to Fig. 14, that the upper crank portion 42 associated with the upper pinion 33 is positioned outoutwardly of the axis of rotation of the upper pinion shaft 34, while the crank portion 42 associated with the lower pinion 33 is positioned inwardly of the axis of rotation of the lower pinion shaft 34. With the parts in the position above described, it will be noted that the action of centrifugal force on the upper weight 38 will tend to draw the link 39 and upper crank portion 42 toward the right of Fig. 14, thus causing the teeth on the inner or lower side of the upper pinion 33 to exert a force on the teeth of the worm 32 tending to move the worm 32 bodily toward the left or in the direction of the arrow *a*. At the same time, the action of centrifugal force on the lower weight 38 will tend to draw the lower link 39 and lower crank portion 42 also toward the right, but by reason of the fact that the lower crank portion 42 is positioned inwardly of the axial line of the lower shaft 34 to which the lower pinion 33 is secured, the action of the lower weight 38 on the teeth at the upper or inner side of the lower pinion 33 will tend to move the worm 32 bodily to the right or in the direction indicated by the arrow *b*; in other words, in a direction opposite to that indicated by the arrow *a*. It will be understood that in the structure illustrated, there are two diametrically disposed pinions 33 and associated crank portions 42 positioned and functioning in the manner described with reference to the upper pinion 33 and crank portion 42 illustrated in Fig. 14, and that there are two transversely and diametrically disposed pinions 33 and cranks 42 positioned and functioning in the manner described with reference to the lower pinion 33 and crank 42 illustrated in Fig. 14, this arrangement being clearly shown in Fig. 2 of the drawings.

As previously stated, the toothed connection between the worm 32 and pinions 33 is non-reversible, that is to say, that as the driving shaft 20 and bracket 28 are rotated, carrying with them the pinions 33, the pinions 33 by reason of their engagement with the worm 32 will be rotated around their respective axes, but rotation of the pinions of themselves about a fixed axis of rotation will not drive the worm 32 about its axis, while rotation of the worm 32 would rotate the pinions 33 about their respective axes. For a clearer understanding, we may assume that the teeth on the periphery of the worm 32 may be inclined at an angle of 82 degrees, for example, with respect to the axial line of rotation of the worm, while the teeth of the pinions 33 may be inclined, for example, at an angle of 8 degrees with respect to the axial line of rotation of the pinions. Thus, it will be seen that rotation of the worm will cause the pinions to be rotated on their respective axes, but rotation of the pinions of themselves will not rotate the worm, thereby providing what I choose to term a non-reversible connection between the worm 32 and pinions 33.

It will be observed that by such an arrangement, the force exerted on the crank or eccentric portions 42 at one side of the pinion axes by the action of the weights 38 will exert a force on the teeth of the worm 32 tending to rotate the worm and shaft section 31 in the same direction in which the driving shaft 20 and bracket 28 are rotated, and when the crank or eccentric portion 42 is on the opposite side of the pinion axes, the force exerted by the weights 38 will tend to rotate the pinions 33 in the opposite direction, but by reason of the non-reversibility of the connection between the pinions 33 and worm 32, such force or tendency will not act to rotate the worm 32 in the opposite direction. So as previously stated, the centrifugal force exerted on the weights 38 acts on the eccentrics 42 and pinions 33 during a portion of their rotation to establish a driving connection between the pinions 33 and worm 32 by tending to hold the pinions against rotation on their respective axes and carrying the worm 32 along with them as the driving shaft is rotated, and although during another portion of the rotation of the pinions 33 and their associated crank or eccentric portions, no force is exerted tending to rotate the worm 32 along with the rotation of the driving shaft, it is also true that no force is applied which would tend to rotate the worm in the opposite direction.

It will be observed that by such an arrangement, the action of the weights 38 and pinions 33 on the worm 32 is applied in such a manner as to cause the worm 32 to rotate in the direction of rotation of the driving member 20 and bracket 28, and that, at no time, is any force applied which would tend to cause the rotation of the worm 32 in the opposite direction.

Rotatably journaled upon the shaft section 31 is a cage 45 comprising plates 46 and 47, said plates being held in spaced relation by a plurality of posts 48 having shoulders 49 against which the plates abut. The plates are secured to the posts by nuts 50 screw-threaded upon the posts.

Figure 7:
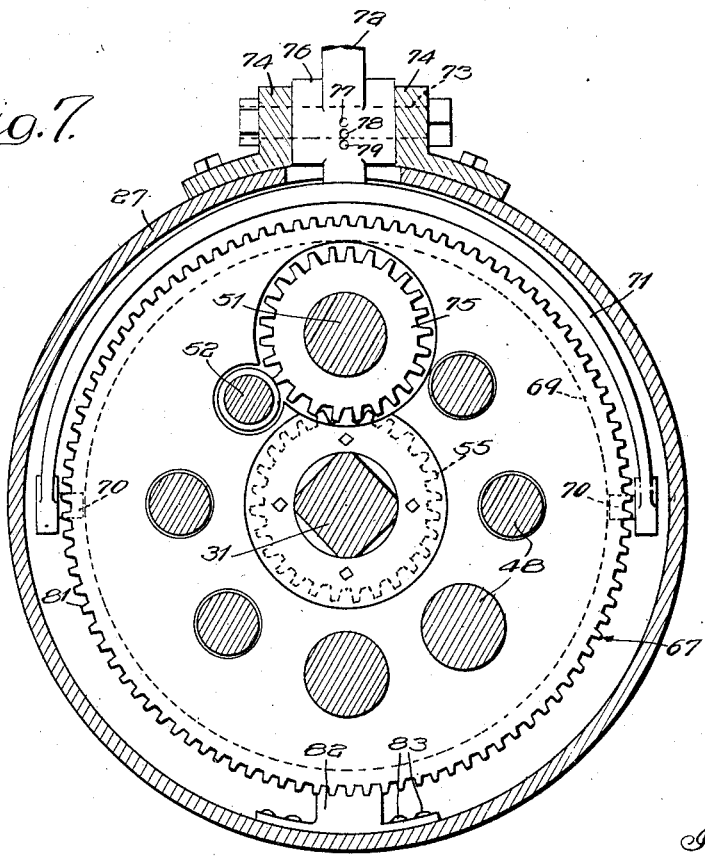
Fig. 7 is a sectional elevation taken on line 7—7 of Fig. 1.
Figure 8:
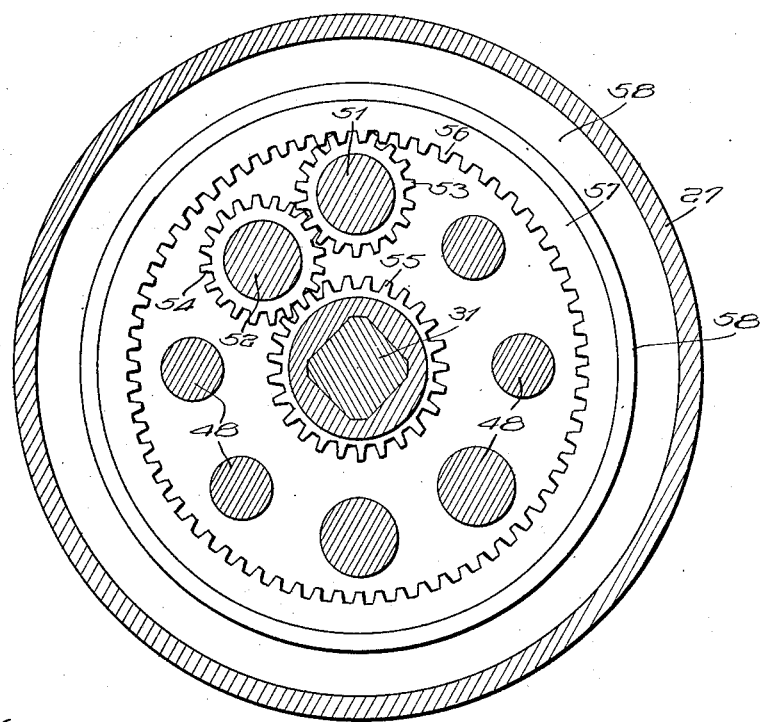
Fig. 8 is a sectional elevation taken on line 8—8 of Fig. 1.
Figure 9:
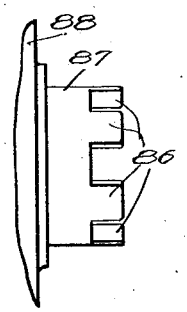
Fig. 9 is a side elevation of a member forming part of the apparatus shown in Fig. 1.
Figure 10:
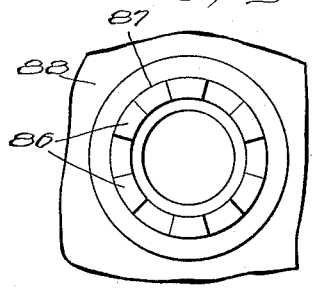
Fig. 10 is an end elevation of the member shown in Fig. 9.
Figure 11:
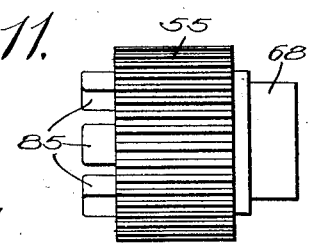
Fig. 11 is a side elevation of a member adapted to cooperate with the member shown in Figs. 9 and 10.
Figure 12:
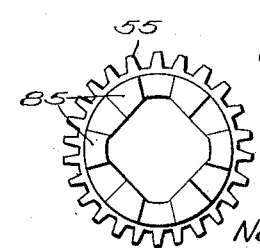
Fig. 12 is an end elevation of the member shown in Fig. 11.

Rotatably journalled in plates 46 and 47 are shafts 51 and 52 (see Figs. 1, 7, 8 and 13). Rigidly secured to the shaft 51 is a pinion 53 which meshes with a pinion 54 secured to the shaft 52, the pinion 54 being arranged to mesh with a gear 55 slidably mounted upon the shaft section 31. As best shown in Figs. 1, 7 and 8, the shaft section 31 is provided with a portion of substantially rectangular cross section to slidably journal the gear 55. Pinion 53 meshes with an internal gear 56 cut in a ring 57 rigidly secured in an annular flange or drum 58 carried by the propeller shaft 21 and shown, in the present instance, as formed integrally therewith.

The construction just described is such that when the parts of the apparatus are in the position shown in Fig. 1, and the shaft section 31 is driven at a relatively low speed in a manner hereinafter described, the rotation of the shaft section 31 is imparted to the propeller shaft 21 through the gears 55 and 56 and the pinions 53 and 54, the propeller shaft 21 being caused to rotate in the same direction as the shaft section 31 but at a slower rate of speed, the purpose of this construction being to increase the torque of the propeller shaft. It will be noted by reference to Fig. 8 that two of the posts 48 diametrically disposed with respect to the shafts 51 and 52 are enlarged and of substantially the same weight for the purpose of providing a counter-balance in the cage structure.

Means are provided for controlling the rotation of the cage 45 as a unit around the longitudinal axis of the shaft section 31, the said means being shown, in the present instance, (Fig. 13) as comprising a spirally toothed gear 59 adapted to be engaged by spirally formed teeth 60 formed on the periphery of the plate 47. The gear 59 is rotatably and slidably journaled upon a shaft 61 mounted in bearings 62 shown in the present instance as formed integrally with the transmission housing 27. A plurality of clutch teeth 63 formed on a hub portion 64 of the gear 59 are adapted to engage with clutch teeth 65 formed on one of the bearings 62, the teeth 63 in the present instance, being yieldingly urged into engagement with the teeth 65 by a compression spring 66 interposed between the worm gear and the opposite bearing member 62. It will be obvious from the foregoing description that when the shaft section 31 is rotated in a clockwise direction (Fig. 13), the gear 59 will be displaced by the spirally formed teeth 60 against the action of the spring 66 in a manner to disengage the teeth 63 and 65 and the spirally formed teeth 60 will then rotate the gear 59 on the shaft 61 without in any way retarding the rotation of the cage 45. If, however, the cage 45 and plate 47 tend to rotate in a counter clockwise direction (Fig. 13), the gear 59 will be moved longitudinally of the shaft 61 until the clutch teeth 63 engage the teeth 65 thereby preventing rotation of the worm gear and locking the cage 45 against further rotation in a counter clockwise direction.

Means are provided for moving the gear 55 longitudinally of the shaft section 31 for positioning the gear in and out of mesh with the pinion 54, the said means, in the present instance, comprising a collar 67 journalled on a hub 68 formed integrally with the gear 55. The collar 67 is apertured to accommodate the posts 48 and the shafts 51 and 52 and is preferably provided on its outer surface with a circumferential groove 69 adapted to receive a pair of pins 70 carried by a fork 71 secured to one end of a lever 72 which is pivotally mounted intermediate its end portions on a pin 73, said pin being mounted in a bracket member 74 rigidly secured to the housing 27.

The arrangement of the structure just described is such that when the lever 72 is angularly displaced in a counter clockwise direction (Fig. 1) around its pivotal axis, the gear 55 is disengaged from the pinion 54 and brought into mesh with a pinion 75 formed integrally with or secured to the shaft 51. The lever 72, in the present instance, is provided with a hub 76 through which the pin 73 passes, and it will be noted that the hub 76 is provided with a plurality of depressions 77, 78, and 79 adapted to receive a spring actuated ball detent 80 for yieldingly securing the lever 72 in various positions of angular adjustment. When the gear 55 is in mesh with the pinion 75, the ball detent 80 engages the depression 79 and prevents accidental displacement of the lever. The depression 78 is provided to receive the ball detent in a manner to yieldingly hold the gear 55 in a position intermediate the pinions 54 and 75 so that the transmission mechanism may, if desired, be placed in a neutral position.

The collar 67, in the present instance, is provided with gear teeth 81 adapted to mesh with a gear segment 82 when the gear 55 is in mesh with the pinion 75, the gear segment 82 being rigidly secured in the transmission housing 27 by any suitable means as, for example, by the rivets or screws 83 (see Fig. 7). It may be well, at this time, to point out that when the gear 55 is in mesh with the pinion 75 and the shaft section 31 is driven in a clockwise direction (Figs. 7 and 8,) the gear 55 will drive the pinion 75, and the pinion 53 will drive the gear 56 secured to the flange or drum 58 and will cause the shaft 21 to rotate in a counter clockwise direction for reversing the normal or forward movement of the automobile or other vehicle driven by the shaft 21.

It will be observed from the foregoing description that the shaft section 31 is not only a driven member or element but also a driving member, and that by suitable driving connections through the gear 55, pinions 54 and 53 and internal gear 56 secured to the annular flange or drum 58, the driven member or shaft 21 may be rotated at relatively reduced speed in the same direction of rotation as the driving member 20 and shaft section 31, and also that by shifting the gear 55 into engagement with the gear 75, the shaft 21 may be driven in a reverse direction.

Figure 5:
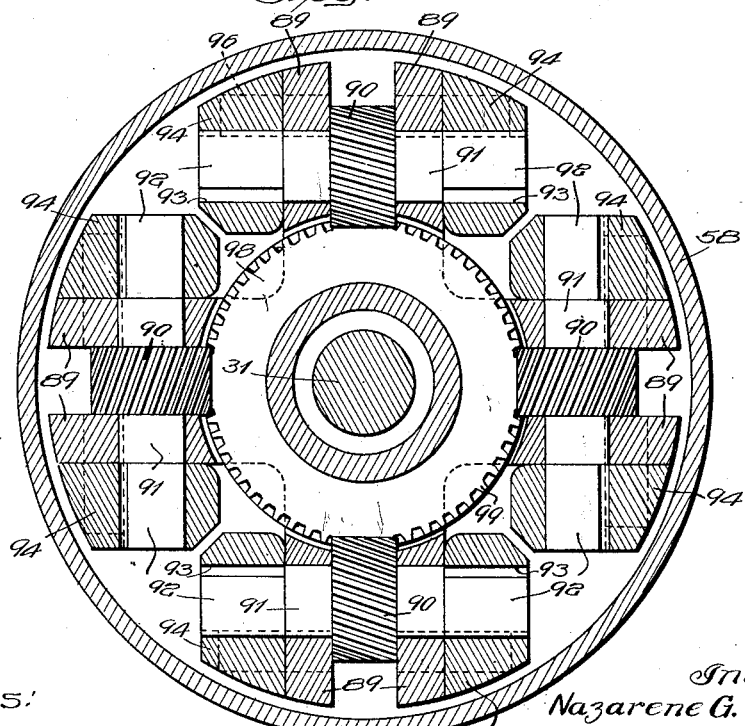
Fig. 5 is a sectional elevation taken on line 5—5 of Fig. 1.
Figure 6:
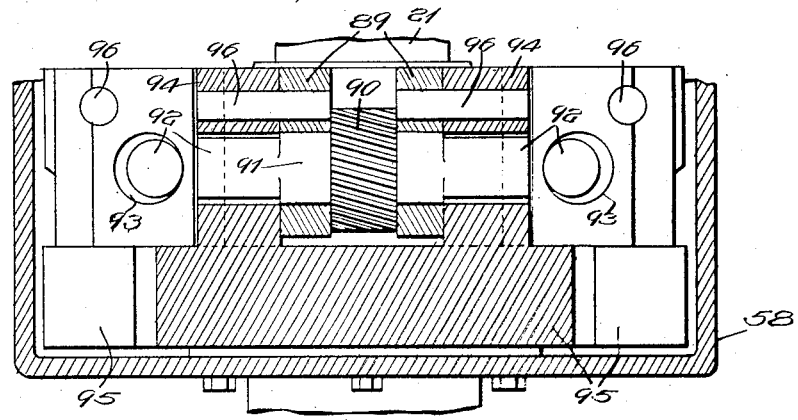
Fig. 6 is a sectional plan view taken substantially as indicated by the line 6—6 of Fig. 1.

For establishing a direct connection between the shaft section 31 and the driven member or propeller shaft 21, the gear 55, in the present instance, is provided with clutch teeth 85 engageable with clutch teeth 86 formed on one end of the hub portion 87 of a bracket member 88 rotatably journaled on the shaft section 31 (see Figs. 1 and 9 to 12, inclusive). The member 88 is preferably provided with radially extending annularly spaced bifurcated integral pairs of arms 89 between the respective pairs of which are positioned planetary worm gears or pinions 90 secured to shafts 91 extending transversely to the axis of rotation of the shaft section 31 and rotatably journaled in the respective pairs of arms 89, the said shafts 91 extending beyond the outer faces of the arm and being provided, within the diameter of the shafts, with eccentric or crank portions 92 (see Figs. 1, 5 and 6) adapted to be received by relatively large apertures 93 formed in the arm or lever portions 94 of centrifugally actuated weights 95, the arm or lever portions 94 being pivotally mounted on the pins 96 carried by the pairs of radially extending arms 89.

Secured to the driven member or shaft 21 by means of bolts 97 is a worm 98 having spirally formed teeth 99 on the periphery thereof adapted to mesh with the teeth of the worm gears 90 secured to the shafts 91.

As previously stated, when the gear 55 is in the position shown in Fig. 1, and the shaft section 31 is driven in a clockwise direction (Fig. 8), the driven member or shaft 21 will be rotated at relatively reduced speed in the same direction, and by reason of the engagement of the clutch teeth 85 on the gear 55 with the clutch teeth 86 on the member 88 will cause the member 88 and arms 89, together with the spirally toothed gears or pinions 90 to revolve about the axial line of rotation of the shaft section 31, the gears 90 and their respective shafts 91 rotating in their respective bearings in the arms 89 by reason of the engagement of the teeth of the worm gears 90 with the spirally formed teeth 99 of the gear 98, and by reason of the action of the weights 95, transmitting a portion of the power from the shaft section 3 to the shaft 21 spirally formed teeth 99 of the gear 98. As the speed of the shaft section 31 increases and the member 88 continues to rotate with the shaft section at increased speed the weights 95 will be moved outwardly with greater centrifugal force about their pivotal connections on the pins 96 until the apertured arms 94 engage the eccentric or crank portions 92 of the shafts 91 with sufficient force to stop the rotation of the shafts 91 and worm gears 90, thereby establishing a rigid connection between the gears 90 and the worm 98 in a manner to cause the driven member or shaft 21 to rotate in unison with the shaft section 31. Thus, it will be observed that as the speed of the shaft section 31 is increased, the construction and arrangement just described will cause a gradual increase in the speed of rotation of the member or shaft 21 until such time as sufficient force is exerted on the crank or eccentric portions 92 to prevent further rotation of the worm gears 90 and establish a positive connection through the worm 98 between the shaft section 31 and member 21.

The operation of the above described apparatus is substantially as follows: Assuming that the apparatus is adjusted as illustrated in Fig. 1, and assuming that the internal combustion engine of an automobile to which the apparatus may be applied is idling at a speed of 150 R. P. M. or thereabouts, the springs 43 will urge the weights or members 38 inwardly toward the bracket 28 and the pinions 33 will revolve or race around the worm 32 without transmitting any power of the shaft section 31. Obviously, this portion of the apparatus functions substantially as a clutch for when the speed of the shaft 20 increases, the centrifugal force exerted on the members 38 causes them to be displaced against the action of the springs 43 in a manner to bring the outer ends of the elongated apertures 41, formed in the links 39, into engagement with the eccentric or crank portions 42 of the shafts 34. The leverage or pull exerted by the links 39 upon or against the portions 42 will gradually retard and eventually stop the rotation of the shafts 34 and pinions or worm gears 33 around their respective axes of rotation until at a predetermined speed, the action of the members 38 and links 39 upon the crank portions 42 will be of sufficient force to prevent rotation of the shafts 34 and pinions 33 around their axes of rotation. The pinions 33 will then cause the worm 32 to rotate in unison with the shaft 20, this movement being transmitted to the shaft section 31.

As explained above, rotation of the shaft section 31 will be accompanied by the rotation of the splined gear 55 which will drive the pinions 54 and 53 so that the gear 56 will rotate the propeller shaft 21. It is readily understood that the speed of rotation of the propeller shaft 21 will increase proportionately as the speed of rotation of the gear 32 and the shaft section 31 increases so that the load will be picked up gradually. Any tendency of the cage 45 to rotate in a counter clockwise direction (Fig. 13) will cause the clutch teeth 63 to engage the clutch teeth 65 in such manner that the cage will be locked against rotation in a counter clockwise direction.

Assuming that the engine speed is further increased, it is obvious that the apertured arms 94, by reason of the force exerted on the weights 95, will engage the eccentric or crank portions 92 with greater force and tend to further retard the rotation of the worm gears 90 in a manner to gradually pick up the load until the engine speed is sufficient to cause the arms 94 to engage the crank portions 92 with sufficient force to stop the rotation of the gears 90 and cause the shaft 21 to rotate in unison with the shaft section 31. The propeller shaft 21 will then be directly coupled to the shaft 20 and will rotate in unison therewith, the cage 45 and parts carried thereby rotating as a unit around the axis of the shaft section.

If it is desired to drive the automobile in a rearward direction, the lever 72 is shifted into a position wherein the gear 55 meshes with the pinion 75 and the gear teeth 81 formed on the collar 67 engage the teeth of the gear segment 82. Then, when the throttle of the automobile is opened and the speed of the engine is increased to cause the pinions 33 to drive the worm 32 and the shaft section 31 in a clockwise direction (Fig. 7), the rotation of the shaft section will be imparted to the propeller shaft 21 through the pinions 75 and 53 and gear 56, the propeller shaft being rotated in the opposite direction.

If at any time it is desired to race the engine or to make tests thereon in order to adjust the carburetor, or other apparatus associated with the engine, the lever 72 may be shifted into the position wherein the ball 80 engages the depression 78, the gear 55 will then be positioned between the pinion 54 and the pinion 75 in what may be termed a "neutral" position.

Obviously, the present invention is not limited to the precise construction and arrangement shown and described, as the same may be variously modified. Moreover, all the features of the present invention need not be used conjointly, as the same may be used to advantage in variously different combinations and sub-combinations.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. Power transmission apparatus comprising a rotatable driving member, a driven element, and means for operatively connecting said member and element, said means comprising a centrifugally actuated weight pivotally mounted on said driving member on an axis extending transversely to the axis of rotation of said member, a connecting member mounted on said driven element, a second connecting member rotatably mounted on said driving member on an axis extending transversely to the axial line of said driving member and cooperable with said first mentioned connecting member, and means pivotally connected to said weight and operatively related to said second connecting member for controlling the rotation of the latter in a manner to establish a driving connection between said connecting members when centrifugal force is exerted upon said weight by reason of the rotation of said driving member at a predetermined speed.

2. Power transmission apparatus comprising a driving member, a driven element, and means for operatively connecting said member and element, said means comprising a centrifugally actuated weight mounted on said driving member, a connecting member mounted on said driven element, a second connecting member rotatably mounted on said driving member and cooperable with said first mentioned connecting member, the axis of said second connecting member being positioned at an angle to the axial line of said driving member, and a link pivotally connected to said weight and operatively related to said second connecting member for controlling the rotation of the latter in a manner to establish a driving connection between said connecting members when centrifugal force is exerted upon said weight by reason of the rotation of said driving member at a predetermined speed.

3. Power transmission apparatus comprising a rotatable driving member, a driven element, and means for operatively connecting said member and element, said means comprising a centrifugally actuated weight mounted on said driving member, a connecting member mounted on said driven element, a connecting member cooperable with said first mentioned connecting member and rotatably mounted on said driving member on an axis extending at an angle to the axial line of rotation of said driving member, a portion associated with said second connecting member and eccentrically related to the axial line thereof, and means operatively related to said weight and to said portion for controlling the rotation of said second connecting member in a manner to establish a driving connection between said connecting members when said driving member is rotated at a predetermined speed.

4. Power transmission apparatus comprising a rotatable driving member, a driven element, and means for operatively connecting said member and element, said means comprising a centrifugally actuated weight pivotally mounted on said driving member, a connecting member mounted on said driven element, a second connecting member cooperable with said first mentioned connecting member and rotatably mounted on said driving member on an axis extending transversely to the axial line of rotation of said driving member, a portion associated with said second connecting member and eccentrically related to the axial line thereof, and a link pivotally connected to said weight and to said portion for controlling the rotation of said second connecting member in a manner to establish a driving connection between said connecting members when said driving member is rotated at a predetermined speed.

5. Power transmission apparatus comprising a rotatable driving member, a driven element, and means for operatively connecting said member and element, said means comprising a centrifugally actuated weight pivotally mounted on said driving member, a toothed gear mounted on said driven element, a planetary pinion cooperable with said gear and rotatably mounted on said driving member on an axis extending transversely to the axial line of rotation of said driving member, a portion associated with said pinion and eccentrically related to the axial line thereof, and a link pivotally connected to said weight and to said portion for controlling the rotation of said pinion in a manner to establish a driving connection between said gear and pinion when said driving member is rotated at a predetermined speed.

6. Power transmission apparatus comprising a rotatable driving member, a driven element, and means for operatively connecting said member and element, said means comprising a centrifugally actuated weight pivotally mounted on said driving member, a spirally toothed worm mounted on said driven element, a planetary pinion having teeth cooperable with said worm and rotatably mounted on said driving member on an axis extending transversely to the axial line of rotation of said driving member in a manner to rotate about its axis and revolve around said worm when said driving member is rotated at a predetermined low speed, a portion associated with said pinion and eccentrically related to the axial line thereof, and a link pivotally connected to said weight and having an aperture formed therein adapted to receive said portion for stopping the rotation and movement of said pinion around said worm in a manner to establish a driving connection between said worm and pinion when said driving member is rotated at a relatively higher predetermined speed.

7. Power transmission apparatus comprising a rotatable driving member, a driven element, and means for operatively connecting said member and element, said means comprising a plurality of annularly spaced centrifugally actuated weights pivotally mounted on said driving member, a spirally toothed worm mounted on said driven element, a plurality of planetary pinions having teeth non-reversibly cooperable with said worm and rotatably mounted on said driving member on axes extending transversely to the axial line of rotation of said driving member in a manner to revolve around said worm when said driving member is rotated at a predetermined low speed, portions associated with said pinions and eccentrically related to the axial lines thereof and links pivotally connected to said weights and having elongated apertures formed therein adapted to receive said portions for stopping the rotation and movement of said pinions around said worm in a manner to establish a driving connection between said worm and pinions when said driving member is rotated at a relatively higher predetermined speed.

8. Power transmission apparatus comprising a rotatable driving member, a driven element having an axis of rotation coincident with the axis of rotation of said driving member, and means for operatively connecting said member and element, said means comprising a plurality of annularly spaced centrifugally actuated weights pivotally mounted on said driving member, a spirally toothed worm secured to said driven element, a plurality of planetary pinions diametrically positioned around said worm and having teeth cooperable therewith, the said pinions being rotatably mounted on said driving member on axes extending transversely to the axial line of rotation of said driving member and driven element in a manner to revolve around said worm when said driving member is rotated at a predetermined low speed, portions associated with said pinions and eccentrically related to the axial lines thereof, certain of said eccentric portions being adapted to occupy a position relative to their respective associated pinions in opposed relation to the eccentric portions associated with transversely disposed pinions, links pivotally connected to said weights and having elongated apertures formed therein adapted to receive said portions for stopping the rotation and movement of said pinions around said worm in a manner to establish a driving connection between said worm and pinions when said driving member is rotated at a relatively higher predetermined speed, and means for yieldingly opposing the centrifugal force exerted on said weights.

9. Power transmission apparatus comprising a driving shaft, a driven shaft, a shaft section interposed between the driving shaft and driven shaft and having an axis of rotation coincident with the axes of rotation of the driving and driven shafts, means interposed between the driving shaft and the shaft section for effectively connecting them to each other when the driving shaft rotates at a predetermined speed, means including a sliding gear operatively related to said driven shaft and constrained to rotate with the shaft section for imparting rotation of the shaft section to the driven shaft, and means for causing the driven shaft to rotate in unison with the shaft section when the latter rotates at a predetermined speed, said means comprising a bracket mounted on said shaft section and connectable thereto, relatively rotatable connecting members mounted on said bracket and driven shaft, respectively, a centrifugally actuated weight pivotally mounted on said bracket, and means for operatively connecting said weight and one of said connecting members in a manner to stop the relative rotation of said members when centrifugal force is exerted on said weight by reason of the rotation of said shaft section at a predetermined speed.

10. Power transmission apparatus comprising a driving shaft, a driven shaft, a shaft section interposed between the driving shaft and driven shaft and having an axis of rotation coincident with the axes of rotation of the driving and driven shafts, means interposed between the driving shaft and the shaft section for effectively connecting them to each other when the driving shaft rotates at a predetermined speed, means including a sliding gear operatively related to said driven shaft and constrained to rotate with the shaft section for imparting rotation of the shaft section to the driven shaft, means engageable with said sliding gear for reversing the direction in which the driven shaft is rotated, and means for causing the driven shaft to rotate in unison with the shaft section when the latter rotates at a predetermined speed, said means comprising a bracket mounted on said shaft section and connectable to said gear, relatively rotatable connecting members mounted on said bracket and driven shaft, respectively, a centrifugally actuated weight pivotally mounted on said bracket, and an eccentric portion operatively related to said weight and one of said connecting members in a manner to stop the relative rotation of said members when centrifugal force is exerted on said weight by reason of the rotation of said shaft section at a predetermined speed.

11. Power transmission apparatus comprising a driving shaft, a driven shaft, a shaft section interposed between the driving shaft and driven shaft and having an axis of rotation coincident with the axes of rotation of the driving and driven shafts, means interposed between the driving shaft and the shaft section for effectively connecting them to each other when the driving shaft rotates at a predetermined speed, means including a sliding gear operatively related to said driven shaft and constrained to rotate with the shaft section for imparting rotation of the shaft section to the driven shaft, means engageable with said sliding gear for reversing the direction in which the driven shaft is rotated, and means for causing the driven shaft to rotate in unison with the shaft section when the latter rotates at a predetermined speed, said means comprising a bracket mounted on said shaft section and connectable to said gear, a connecting member mounted on said driven shaft, a second connecting member cooperable with said first mentioned member and rotatably mounted on said bracket on an axis extending transversely to the axial line of rotation of said shafts, a portion associated with said second connecting member and eccentrically related to the axial line thereof, and a centrifugally actuated weight pivotally mounted on said bracket and cooperable with said eccentric portion for controlling the rotation of said second connecting member in a manner to establish a driving connection between said members when said shaft section is rotated at a predetermined speed.

12. Power transmission apparatus comprising a driving shaft, a driven shaft, a shaft section interposed between the driving shaft and the driven shaft, means interposed between the driving shaft and the shaft section for connecting them to each other when the driving shaft rotates above an idling speed, means interposed between the shaft section and the driven shaft for imparting rotation of the shaft section to the driven shaft at reduced speed, said last mentioned means comprising a plurality of posts spaced about said shaft section and rotatable thereabout as an axis, gear means secured to said driven shaft, a gear on one of said posts operatively connected to said gear means, a gear on a second post in mesh with said last mentioned gear, a gear splined to said shaft section and adapted to mesh with said gear on said second post, means restricting rotation in one direction of said posts about said shaft section, and means for directly connecting said shaft section and said driven shaft at a predetermined speed of rotation of said shaft section, said last mentioned means comprising a bracket mounted on said shaft section and connectable to said gear, a spirally toothed gear mounted on said driven shaft, a plurality of planetary pinions having teeth cooperable with said spirally toothed gear and rotatably mounted on said bracket on axes extending transversely to the axial line of rotation of said driven shaft in a manner to revolve around said gear when said shaft section is rotated at said reduced speed, portions associated with said pinions and eccentrically related to the axial lines thereof, and a plurality of centrifugally actuated weights pivotally mounted on said bracket and having relatively large apertures formed therein adapted to receive said eccentric portions for stopping the rotation of said pinions in a manner to establish a driving connection between said pinions and spirally toothed gear when said shaft section is rotated at a relatively higher predetermined speed.

13. Power transmission apparatus comprising a driving member, a driven element, and means for operatively connecting said member and element, said means comprising a plurality of centrifugally actuated weights mounted on said driving member, a connecting member mounted on said driven element, a plurality of pairs of transversely disposed secondary connecting members mounted on said driving member and cooperable with said first mentioned connecting member, and means for operatively connecting said weights and said secondary members for controlling the operation of the latter in a manner to establish a driving connection between said connecting members when centrifugal force is exerted on said weights by reason of the rotation of said driving member at a predetermined speed, said last mentioned means including crank portions positioned with respect to the axes of said secondary members in a manner to counter balance the action of said weights on said first mentioned connecting member.

14. Power transmission apparatus comprising a rotatable driving member, a driven element having an axis of rotation coincident with the axis of rotation of said driving member, and means for operatively connecting said member and element, said means comprising a plurality of pairs of annularly spaced centrifugally actuated weights pivotally mounted on said driving member, a spirally toothed worm secured to said driven element, a plurality of pairs of planetary pinions positioned around said worm, the pinions of each of said pairs being positioned at opposite sides of said worm and having teeth cooperable therewith, the said pinions being rotatably mounted on said driving member on axes extending transversely to the axial line of rotation of said driving member and element in a manner to revolve around said worm when said driving member is rotated at a predetermined low speed, portions associated with said pinions and eccentrically related to the axial lines thereof, the eccentric portions of one of said pairs of pinions being adapted to occupy a position relative to their respective associated pinions in opposed relation to the eccentric portions associated with the other and transversely disposed pair of pinions, and links pivotally connected to said weights and to said eccentric portions for stopping the rotation and movement of said pinions around said worm for establishing a driving connection between said pinions and worm when said driving member is rotated at a relatively higher predetermined speed, the position of the eccentric portions of the respective pairs of pinions being such as to counter balance the thrust exerted on said worm by the respective pairs of weights.

In witness whereof, I hereunto subscribe my name this 17th day of July, A. D. 1929.

NAZARENE G. MORICI.